United States Patent [19]

Shirai et al.

[11] Patent Number: 5,665,514
[45] Date of Patent: Sep. 9, 1997

[54] THERMAL TRANSFER IMAGE-RECEIVING SHEET

[75] Inventors: Koichi Shirai; Kazunobu Imoto; Shinji Kometani, all of Tokyo-To, Japan

[73] Assignee: Dai Nippon Printing Co., Ltd., Japan

[21] Appl. No.: 585,195

[22] Filed: Jan. 11, 1996

[30] Foreign Application Priority Data

Jan. 11, 1995 [JP] Japan .................................. 7-018335

[51] Int. Cl.$^6$ .................................. B32B 3/26; G03C 8/52
[52] U.S. Cl. .................. 430/201; 430/207; 428/316.6; 503/227
[58] Field of Search ................................ 430/201, 207; 503/227; 428/316.6

[56] References Cited

U.S. PATENT DOCUMENTS

| | | | |
|---|---|---|---|
| 4,943,555 | 7/1990 | Nakamoto et al. | 430/201 |
| 5,244,861 | 9/1993 | Campbell et al. | 503/227 |
| 5,268,348 | 12/1993 | Egashira et al. | 430/201 |

FOREIGN PATENT DOCUMENTS

| | | |
|---|---|---|
| 0 322 771 | 7/1989 | European Pat. Off. . |
| 0 551 894 A1 | 7/1993 | European Pat. Off. . |
| 0 630 759 A1 | 12/1994 | European Pat. Off. . |

*Primary Examiner*—Richard L. Schilling
*Attorney, Agent, or Firm*—Parkhurst, Wendel & Burr, L.L.P.

[57] ABSTRACT

A thermal transfer image-receiving sheet is disclosed which can provide a sharp image, has excellent suitability for printing in respect of halftone color reproduction and gradation reproduction, has high glossiness and smoothness, a cushioning property, and an excellent appearance because fine scratches, if any, on the surface of the sheet is invisible to the naked eye.

The thermal transfer image-receiving sheet comprises a substrate and a colorant-receptive layer laminated on at least one surface of the substrate, the substrate comprising a laminate of a plurality of plastic films,
 the laminate comprising at least a core layer, of a plastic, containing microvoids and a skin layer, of a plastic, containing microvoids and laminated on either one surface of the core layer on the colorant-receptive layer side or both surfaces of the core layer,
 the volume fraction of the total volume of the microvoids contained in the skin layer based on the volume of the whole skin layer being smaller than the volume fraction of the total volume of the microvoids contained in the core layer based on the volume of the whole core layer,
 the volume fraction of the skin layer being in the range of from 1.0 to 15.0%.

8 Claims, No Drawings

THERMAL TRANSFER IMAGE-RECEIVING SHEET

BACKGROUND OF THE INVENTION

1. Field of the Invention

The present invention relates to a thermal transfer image-receiving sheet which, in use, is laminated on a thermal transfer sheet and receives a colorant thermally transferred from the thermal transfer sheet by means of a thermal head as a device to form an image, and more particularly to a thermal transfer image-receiving sheet which can provide a full-color, high-density recorded image, when used in a thermal transfer recording system using a sublimable dye as a colorant, and has a high glossiness.

2. Background Art

Various thermal transfer recording systems are known in the art, and one of them is a sublimation transfer recording system in which a sublimable dye as a colorant is transferred from a thermal transfer sheet to an image-receiving sheet by means of a thermal head capable of generating heat in response to recording signals, thereby forming an image. In this recording system, since a dye is used as the colorant and the gradation of the density is possible, a very sharp image can be formed and, at the same time, the color reproduction and tone reproduction of half tone are excellent, making it possible to form an image having a quality comparable to that formed by silver salt photography.

By virtue of the above excellent performance and the development of various hardware and software associated with multi-media, the sublimation transfer recording system has rapidly increased the market in a full-color hard copy system for computer graphics, static images through satellite communication, digital images represented by CD-ROM, and analog images such as video.

Specific applications of the image-receiving sheet in the dye sublimation transfer recording system are various, and representative examples thereof include proof printing, output of various images, output of a design, such as CAD/CAM, output applications for various medical instruments for analysis, such as CT scan, output applications for measuring equipment, alternatives for instant photography, output of photograph of a face to identification (ID) cards, credit cards, and other cards, and applications in composite photographs and pictures for keepsake in amusement facilities such as amusement parks, museums, aquariums, and the like.

The thermal transfer image-receiving sheet for sublimation transfer used in the above various applications (hereinafter referred to simply as "thermal transfer image-receiving sheet" or "image-receiving sheet") generally comprises a substrate and a color-receptive layer formed thereon. It is needless to say that what is first required of the image-receiving sheet is high sensitivity in printing and good stability against curling associated with printing.

Further, the diversification of applications of the image-receiving sheet has expanded the market and has led to an ever-increasing demand for color reproduction in halftone, a sharp image free from an uneven density, and high glossiness and smoothness which can impart high-grade feeling to the appearance and improved aesthetic properties.

Under these circumstances, for example, Japanese Patent Laid-Open No. 122991/1990 describes a method for imparting high glossiness and smoothness, wherein a plastic film is put on the surface of a colorant-receptive layer and hot lamination is carried out by heating under pressure. This method, however, necessitates providing additional steps and, further, preparing a plastic film, resulting in remarkably increased production cost.

Japanese Patent Application Nos. 87390/1987, 278087/1987, and 246153/1993 teach the provision of a thermoplastic surface layer (hereinafter referred to as "skin layer"), substantially free from any inorganic fine powder or microvoids, on the outermost surface of a plastic film or synthetic paper used as a substrate or a part of the substrate for an image-receiving sheet.

These methods can certainly provide a high glossiness. The glossiness, however, is excessively high, and, consequently, fine scratches unavoidably created in the production of an image-receiving sheet become very clearly visible, resulting in lowered commercial value due to poor appearance. The fine scratches are not causative of the occurrence of dropout or uneven print density in the printing. They, however, are very clearly visible when the surface has a very high glossiness and is close to a specular surface.

SUMMARY OF THE INVENTION

In view of the problems of the prior art, the present invention has been made, and an object of the present invention is to provide a thermal transfer image-receiving sheet which can provide a sharp image, has excellent suitability for printing in respect of halftone color reproduction and gradation reproduction, has high glossiness and smoothness, and an excellent appearance because fine scratches, if any, on the surface of the sheet are invisible to the naked eye.

The present inventors have made extensive and intensive studies with a view to attaining the above object and, as a result, made discoveries capable of solving the above problems, which has led to the completion of the present invention.

In order to attain the above object, the present invention provides a thermal transfer image-receiving sheet comprising a substrate and a colorant-receptive layer laminated on at least one surface of the substrate, said substrate comprising a laminate of a plurality of plastic films, said laminate comprising at least a core layer, of a plastic, containing microvoids and a skin layer, of a plastic, containing microvoids and laminated on either one surface of the core layer on the colorant-receptive layer side or both surfaces of the core layer, the volume fraction of the total volume of the microvoids contained in the skin layer based on the volume of the whole skin layer being smaller than the volume fraction of the total volume of the microvoids contained in the core layer based on the volume of the whole core layer, the volume fraction of the skin layer being in the range of from 1.0 to 15.0%.

Preferably, the volume fraction of the skin layer is in the range of from 2.0 to 12.0%.

The thickness of the skin layer is preferably in the range of from 1.5 to 10 μm.

The thickness of the skin layer is still preferably in the range of from 2.0 to 8 μm.

The substrate preferably has a support on the surface of the plastic film remote from the colorant-receptive layer.

In the substrate, the plastic film is preferably provided on both surfaces of the support.

The plastic film is preferably a biaxially stretched film composed mainly of polypropylene.

The thermal transfer image-receiving sheet preferably has a surface glossiness of not less than 70% as measured according to JIS Z 8741 Method 4.

In the present invention, since the amount of microvoids in the skin layer is smaller than that in the core layer, the surface of the skin layer has very fine irregularities also after coating of a colorant-receptive layer. As a result, the glossiness and smoothness required of the thermal transfer image-receiving sheet are maintained, and, at the same time, fine scratches created in the production process and subsequent handling become invisible.

The above constitution of the present invention can provide a thermal transfer image-receiving sheet which has high glossiness and smoothness, a cushioning property, excellent suitability for printing with respect to sensitivity in printing, halftone color reproduction and gradation reproduction, and an excellent appearance because fine scratches, even when created on the surface of the sheet by friction or the like, are invisible to the naked eye.

PREFERRED EMBODIMENTS OF THE INVENTION

The layer construction etc. of the thermal transfer image-receiving sheet of the present invention will now be described in more detail.

Plastic film

The plastic film used in the substrate is preferably composed mainly of a polyolefin, particularly polypropylene. Although it is also possible to use a plastic film composed mainly of polyethylene terephthalate (hereinafter referred to as "PET"), the flexibility of PET is so low that the plastic film composed mainly of PET has poor adhesion to a thermal head, resulting in sensitivity in printing inferior to that in the case of polypropylene.

When a further increase insensitivity in printing for the film composed mainly of polypropylene is desired, the provision of a foam layer having microvoids is necessary.

In general, there are two methods for forming microvoids in the plastic film. One of them is to carry out suitable stretching upon the preparation of a film by mixing and kneading a polymer with inorganic fine particles and then extruding the mixture (compound) into a film. Upon the stretching, the inorganic fine particles serve as a nucleus to form microvoids in the film. The other method for forming microvoids is to carry out suitable biaxial stretching in the preparation of a film by blending a resin as a main component with at least one polymer immiscible with the resin and extruding the resultant compound into a film. The microscopic observation of this compound reveals that the polymers constitute a fine islands-sea structure. Stretching of the film causes cleavage at the interface of the islands-sea structure or large deformation of the polymer constituting the islands, leading to the formation of microvoids.

When the above two methods are compared, the latter method is better suited for the present invention. This is because, according to the latter method, the islands-sea structure in the compound can be made very fine simply by an adequate mixing and kneading, resulting in the formation of very fine voids by stretching. The presence of smaller microvoids in a larger number can provide superior cushioning properties and heat insulating properties to the plastic film while maintaining the flexibility, thus providing higher sensitivity in printing to the resulting image-receiving sheet.

In forming a foam layer having microvoids by the latter method, the use of a polyblend comprising polypropylene as a main component and, added thereto, a polyethylene or acrylic resin having a higher melting point than polypropylene is known in the art.

In this case, polyethylene and acrylic resin serve as a foaming agent. In the case of both polypropylene and acrylic resin, the content is preferably 2 to 10 parts by weight based on 100 parts by weight of polypropylene. When the content is not more than 2 parts by weight, the creation of microvoids is unsatisfactory, resulting in unsatisfactory sensitivity in printing. On the other hand, when the content is not less than 10 parts by weight, the heat resistance and other properties of the film are unfavorably deteriorated.

In order to create finer and denser voids, it is preferred to further add polyisoprene. This results in higher sensitivity in printing. Thus, a plastic film having a higher sensitivity in printing can be provided by blending polypropylene as a main component with an acrylic resin or polyethylene and polyisoprene to prepare a compound, extruding the compound into a film, and stretching the film.

The apparent specific gravity of the plastic film is preferably in the range of from 0.50 to 0.75 g/cm$^2$. The microvoids are, in many cases, in a flat form. However, they are preferably as spherical as possible. From the viewpoint of imparting excellent printing properties, the distribution of the microvoids is preferably such that microvoids having a uniform size are uniformly distributed.

The Young's modulus of the plastic film is preferably $1 \times 10^6$ to $1 \times 10^{10}$ Pa(Pascal) at 25° C. When it is less than $1 \times 10^6$ Pa, the plastic film is so flexible that the heat resistance and mechanical strength are poor. On the other hand, when it exceeds $1 \times 10^{10}$ Pa, the plastic film lacks flexibility, resulting in poor carriability in a printer and poor contact with a thermal head.

If necessary, it is also possible to add minor amounts of inorganic pigments and fluorescent brightening agents to the plastic film.

The above description pertains to finding or embodiments for a plastic film, as a whole, having a multi-layer structure used in the image-receiving sheet of the present invention. Individual layers constituting the multi-layer plastic film will now be described in detail.

Core layer and skin layer

When the above plastic film is of a single layer of a foam layer having microvoids, glossiness and high-grade feeling such as provided by sliver salt photography cannot be attained although the high sensitivity in printing is high. Further, in this case, surface irregularities derived from microvoids often cause dropout and uneven density.

For this reason, in order to eliminate the above drawback and to impart a high glossiness, it is indispensable for the plastic film to have such a layer construction that the foam layer is used as a core layer and a skin layer having microvoids in a smaller amount than the core layer is provided on the surface of the core layer.

The thickness of the core layer constituted by a foam layer is preferably 50 to 96% based on the whole thickness of the plastic film.

The volume fraction of the microvoids, contained in the core layer, based on the whole core layer is preferably 10 to 25%, and the apparent specific gravity of the core layer is preferably 0.45 to 0.75 g/cm$^3$.

Regarding a material for the skin layer, the use of a polyolefin resin is preferred when moldability and adhesion to the core layer or an opaque layer, which will be described later, are taken into consideration. In this case, when polypropylene is used for the formation of the core layer, it is preferred to use polypropylene for the formation of the skin layer.

The provision of a skin layer on the surface of the core layer offers an image-receiving sheet having a high glossiness. The provision of a thermoplastic surface layer (skin layer), substantially free from an inorganic fine powder or microvoids, on the surface of the core layer, as proposed in Japanese Patent Application Nos. 87390/1987, 278087/1987 and 246153/1993, a high glossiness can be provided. In this case, however, the glossiness is excessively high, and, consequently, fine scratches unavoidably created in the production of an image-receiving sheet become very clearly visible, resulting in poor appearance.

Fine scratches unavoidably created in the production of an image-receiving sheet are as follows.

In the production of an image-receiving sheet, as described below, the provision of a colorant-receptive layer on a plastic film by coating, slitting and sheet cutting into desired width or size, wrapping and packaging and the like are carried out. In this case, contact of the image-receiving sheet with guide rolls in various facilities and friction between a plurality of image-receiving sheets are unavoidable. This inevitably results in the creation of fine scratches.

In order to solve this problem, according to the present invention, microvoids in a smaller amount than the amount of microvoids contained in the core layer are provided in the skin layer on the core layer to create such irregularities that very fine scratches are rendered invisible to the naked eye while high glossiness and smoothness of the surface of the image-receiving sheet are maintained.

The volume fraction of the microvoids present in the skin layer is preferably 1.0 to 15.0% based on the volume of the whole skin layer. When it is less than 1.0%, it is impossible to create such irregularities that very fine scratches are rendered invisible to the naked eye. On the other hand, when it exceeds 15.0%, the glossiness of the image-receiving sheet is unfavorably lowered.

For this reason, the volume fraction of the microvoids present in the skin layer based on the volume of the whole skin layer is in the range of from 1.0 to 15.0%. It is preferably in the range of from 2.0 to 12.0%.

The thickness of the skin layer is preferably 1.5 to 10 μm. When it is less than 1.5 μm, the glossiness is unsatisfactory. On the other hand, a thickness exceeding 10 μm adversely affects the sensitivity in printing.

For this reason, the thickness of the skin layer is preferably in the range of from 1.5 to 10 μm, still preferably in the range of from 2.0 to 8 μm.

The volume fraction of the microvoids contained in the core layer and the skin layer is measured by the following method.

The section of a plastic film sample is observed under an electron microscope and photographed, and the percentage area Sr of microvoids in the section is determined. Sr is an average value of 5 samples (n=5). The volume fraction defined as Sr to the three-half power, i.e., $Sr^{3/2}$.

Opaque layer

When a high opaqueness should be imparted to the plastic film, an opaque layer may be provided between the core layer and the skin layer.

The opaque layer is preferably formed of a dispersion of a white pigment in a binder polymer composed mainly of polypropylene which is the same polymer as used in the core layer. White pigments usable herein include calcium carbonate, talc, kaolin, titanium oxide, zinc oxide, and other known inorganic pigments, and, when the opaqueness-imparting property, the whiteness and other properties are synthetically taken into consideration, the use of titanium dioxide is preferred. The thickness of the opaque layer is preferably 1 to 10 μm. When it is less than 1 μm, the opaqueness-imparting property is very unsatisfactory, while a thickness exceeding 10 μm adversely affects the sensitivity in printing.

Since the surface skin layer is formed of polypropylene, the plastic film thus obtained often has unsatisfactory adhesion to a layer formed thereon, such as a colorant-receptive layer, leading to troubles such as abnormal transfer during printing.

Known means for improving the adhesion of a polypropylene film to various other materials is corona discharge treatment. However, this method, when used alone, has a problem that the adhesion deteriorates with the elapse of time. Further, when the construction of the plastic film is such that a skin layer is provided on both surfaces of the core layer, that is, the skin layers are provided symmetrically with respect to the core layer, corona discharge treatment of both surfaces of the plastic film followed by rolling often causes blocking. In order to solve this problem, an adhesive layer may be provided on the surface skin layer by coating.

The adhesive layer may be formed of preferably a known polymer, such as a urethane resin, an acrylic resin, a polyester, a polyvinyl alcohol resin, or polyvinylidene chloride depending upon properties of a layer formed thereon by coating, such as a colorant-receptive layer. The adhesive layer is as thin as possible from the viewpoint of avoiding adverse effect on the above-described various functions of the plastic film and is preferably not more than 2 μm.

The thickness of the whole plastic film is preferably 30 to 80 μm. When it is less than 30 μm, the foam layer having voids becomes substantially thin, resulting in lowered sensitivity in printing. Further, in this case, uneven density is likely to occur due to the influence of very small irregularities on the support which will be described later. On the other hand, when the thickness exceeds 80 μm, the whole thickness of the image-receiving sheet including the support becomes large, adversely affecting the carriability of the image-receiving sheet in a printer.

The thickness of the whole image-receiving sheet including the support is preferably 100 to 250 μm.

The above plastic film may be prepared, for example, by a method which comprises co-extruding a compound for a core layer and a compound for a skin layer by means of a co-extruder into a film having a two- or three-layer structure and then biaxially stretching to create microvoids in the resultant core layer and the skin layer(s), a method which comprises first extruding a compound for a core layer by means of an extruder into a film, extruding and laminating a compound, for a skin layer, on one or both surfaces of the film and then biaxially stretching the laminate to create microvoids, and a method which comprises first extruding a compound for a core layer by means of an extruder into a film, uniaxially stretching the film in a longitudinal direction, extruding and laminating a compound, for a skin layer, on one or both surfaces of the core layer, and then stretching the laminate in a lateral direction to create microvoids. All the above methods can be utilized in the present invention.

Further, when an opaque layer, which will be described later, in addition to the core layer and the skin layer is necessary, it, together with the skin layer or the like, may be provided by co-extrusion.

Support

When the substrate of the image-receiving sheet consists of the above plastic film alone, curling is likely to occur due to heat applied during printing. Therefore, such an image-receiving sheet has poor curling resistance. In this case, various supports may be laminated on the plastic film to prevent curling and to impart excellent overall suitability for printing.

Various types of paper composed mainly of a cellulosic fiber, such as coat paper, art paper, glassine paper, cast coat paper, wood free paper, kraft paper, and paper impregnated with a resin, and films including PET films may be used as the support. In particular, when the image-receiving sheet should be smooth and when dimensional stability against moisture is strongly required, the use of a PET film is preferred. The support can be laminated onto the plastic film by known methods such as dry lamination and extrusion lamination (the so-called "sandwich lamination").

Mere lamination of the support onto the plastic film cannot completely prevent curling associated with printing and curling associated with a change in environment. In order to satisfactorily prevent curling, it is preferred to provide an anticurl layer onto the support on its surface remote from the plastic film. The provision of a plastic resin layer as the anticurl layer is preferred. For example, a layer of a polyolefin resin is useful. More specifically, the plastic resin layer is formed of preferably a polyethylene resin which is a blend of a low-density polyethylene with a high-density polyethylene. The sole use of the low-density polyethylene results in deteriorated heat resistance. On the other hand, the sole use of the high-density polyethylene is unrealistic from the viewpoint of a problem of suitability for the formation of a layer. The ratio of the low-density polyethylene to the high-density polyethylene is preferably in the range of from about 30:1 to 5:5.

The thickness of the polyethylene resin layer is preferably 30 to 130% of the thickness of the plastic film. When it is less than 30%, no satisfactory anticurling performance can be attained. On the other hand, a thickness exceeding 130% results in mere increase in the thickness of the image-receiving sheet, and the anticurling performance is saturated and substantially the same as that attained in the case of a thickness of not more than 130%, or curling occurs in a direction opposite to that in the case of a thickness of less than 30%.

The anticurl layer may be formed by laminating the above plastic film on both surfaces of the support as a core material.

Further, a slipperiness-imparting layer may be provided on the surface of image-receiving sheet remote from the colorant-receptive layer (i.e., the back surface of the image-receiving sheet). The slipperiness-imparting layer may be formed of a blend of a conventional resin with various additives such as a filler or silicone.

Colorant-receptive layer

The colorant-receptive layer is formed of a varnish composed mainly of a resin dyeable with a colorant and, added thereto, optional various additives such as a release agent. Dyeable resins usable herein include polyolefin resins such as polypropylene; halogenated resins such as polyvinyl chloride and polyvinylidene chloride; vinyl resins, such as polyvinyl acetate and polyacrlylic esters, and copolymers thereof; polyester resins such as polyethylene terephthalate and polybutylene terephthalate; polystyrene resins; polyamide resins; copolymers of olefins, such as ethylene or propylene, with other vinyl monomers; ionomers; and cellulose derivatives. They may be used alone or as a mixture of two or more. Among them, polyester resins and vinyl resins are preferred.

A release agent may be incorporated into the colorant-receptive layer in order to prevent the colorant-receptive layer from being heat-fused to a thermal transfer sheet in the course of image formation. Silicone oil, phosphoric ester plasticizers, and fluorine compounds may be used as the release agent. Among them, silicone oil is particularly preferred. The amount of the release agent added is preferably 0.2 to 30 parts by weight based on 100 parts by weight of the resin for forming the receptive layer. If necessary, a fluorescent brightening agent and other additives may be further incorporated into the colorant-receptive layer.

The colorant-receptive layer may be formed by any conventional coating method such as roll coating, bar coating, gravure coating, or gravure reverse coating. The coverage is preferably 0.5 to 10 g/m$^2$ (on a solid basis).

Whiteness- and opaqueness-imparting layer

If necessary, a whiteness- and opaqueness-imparting layer may be provided between the colorant-receptive layer and the substrate. The whiteness- and opaqueness-imparting layer (hereinafter referred to as "white layer") is formed of preferably a resin as a binder with a white pigment incorporated therein.

From the viewpoint of adhesion to the colorant-receptive layer, the binder resin used may be resins, such as chlorinated polypropylene, polyurethane, polycarbonate, polymethyl methacrylate (hereinafter referred to as "PMMA"), polyester, and polystyrene; modification products of these resins; and various copolymers of these resins. It is also possible to use a blend of a plurality of the above resins.

White pigments usable herein include conventional inorganic pigments, such as titanium oxide, calcium carbonate, barium sulfate, and zinc oxide. Among them, anatase titanium dioxide is preferred from the viewpoint of whiteness- and opaqueness-imparting property.

The amount of the white pigment added to the binder is preferably 30 to 300 parts by weight based on 100 parts by weight of the binder. When the amount of the white pigment is smaller than 30 parts by weight, the whiteness- and opaqueness-imparting property, particularly opaqueness-imparting property, is poor. On the other hand, when it exceeds 300 parts by weight, the moldability becomes poor and, at the same time, the formed coating is very fragile. If necessary, an additive, such as a fluorescent brightening agent, may be added to the white layer. The above construction poses no practical problem of the adhesion between the white layer and the plastic film. However, when further improved adhesion between the white layer and the plastic film is desired, it is preferred to use a reactive resin, as the binder for the white layer, in combination with a curing agent suitable for the resin. For example, the binder resin used has a hydroxyl group, the use of various isocyanates as the curing agent is most effective.

The present invention will now be described in more detail with reference to the following examples.

EXAMPLE 1

Three-layer co-extrusion was carried out using the following compound 1 for a core layer of a plastic film having microvoids and the following compound 2 for a skin layer provided on both surfaces of the core layer to form a film which was then biaxially stretched to prepare a 60 μm-thick stretched film.

| Compound 1 | |
|---|---|
| (1) Polypropylene | 100 parts |
| (2) Isoprene polymer | 1 part |
| (3) PMMA | 7 parts |

| Compound 2 | |
|---|---|
| (1) Polypropylene | 100 parts |
| (2) Isoprene polymer | 1 part |
| (3) PMMA | 2 parts |

In the resultant film, the thickness of the core layer was 50.0 μm with the thickness of each of the skin layers on respective surfaces of the core layer being 5.0 μm.

The volume fraction of microvoids in the core layer was 18.2% with the volume fraction of microvoids in the skin layer being 5.5%.

This film was laminated on both surfaces of a white PET film [W-400 (thickness 75 μm), manufactured by Diafoil Co., Ltd.] to prepare a substrate.

The following coating liquid for a receptive layer was coated on one surface of the substrate by gravure reverse coating at a coverage on a dry basis of 4.0 g/m² to form a colorant-receptive layer, thereby preparing a thermal transfer image-receiving sheet.

| Coating liquid for receptive layer | |
| --- | --- |
| (1) Ethylene/vinyl acetate copolymer (#1000A, manufactured by Denki Kagaku Kogyo K. K.) | 7.2 parts |
| (2) Styrene/acrylate copolymer(#400A, manufactured by Denki Kagaku Kogyo K. K.) | 1.6 parts |
| (3) Polyester (Vylon 600, manufactured by Toyobo Co., Ltd.) | 11.2 parts |
| (4) Vinyl-modified silicone (X-62-1212, manufactured by The Shin-Etsu Chemical Co., Ltd.) | 2.0 parts |
| (5) Platina catalyst CAT PLR-5 | 1.0 parts |
| (6) Platina catalyst CAT PL-50T | 1.2 parts |
| (7) Methyl ethyl ketone/Toluene (weight ratio = 1/1) | 78.0 parts |

EXAMPLE 2

A thermal transfer image-receiving sheet was prepared in the same manner as in Example 1, except that, instead of compound 2, the following compound 3 was used as the compound for a skin layer.

In the thermal transfer image-receiving sheet thus obtained, the volume fraction of microvoids in the skin layer was 14.1%.

| Compound 3 | |
| --- | --- |
| (1) Polypropylene | 100 parts |
| (2) Isoprene polymer | 1 part |
| (3) PMMA | 4 parts |

EXAMPLE 3

A thermal transfer image-receiving sheet was prepared in the same manner as in Example 1, except that the thickness of the skin layer after biaxial stretching was 2 μm for both the skin layers.

The total film thickness was 54 μm (skin layer: 2 μm/core layer: 50 μm/skin layer: 2 μm). The volume fraction of microvoids in the skin layer was 5.5%.

EXAMPLE 4

A thermal transfer image-receiving sheet was prepared in the same manner as in Example 1, except that the thickness of the skin layer after biaxial stretching was 8 μm for both the skin layers.

The total film thickness was 66 μm (skin layer: 8 μm/core layer: 50 μm/skin layer: 8 μm). The volume fraction of microvoids in the skin layer was 5.5%.

EXAMPLE 5

A thermal transfer image-receiving sheet was prepared in the same manner as in Example 1, except that, instead of compound 2, the following compound 4 was used as the compound for a skin layer.

In the thermal transfer image-receiving sheet thus obtained, the volume fraction of microvoids in the skin layer was 1.1%.

| Compound 4 | |
| --- | --- |
| (1) Polypropylene | 100 parts |
| (2) Isoprene polymer | 1 part |
| (3) PMMA | 1 part |

Comparative examples will now be described.

EXAMPLE 6

A thermal transfer image-receiving sheet was prepared in the same manner as in Example 1, except that, instead of a white PET film [W-400 (thickness 75 μm), manufactured by Diafoil Co., Ltd.], a coated paper [OK Coat, manufactured by Shin-oji Seishi K.K.] was used.

Comparative Example 1

A thermal transfer image-receiving sheet was prepared in the same manner as in Example 1, except that a film of a core layer alone was prepared without providing any skin layer so that the thickness of the film after biaxial stretching was 60 μm.

The volume fraction of microvoids in the film was 18.2%.

Comparative Example 2

A thermal transfer image-receiving sheet was prepared in the same manner as in Example 1, except that, instead of compound 2, polypropylene alone was used for the formation of the skin layer and the volume fraction of microvoids in the resultant skin layer was 0%.

Properties of the thermal transfer image-receiving sheets prepared in Examples 1 to 6 and Comparative Examples 1 and 2 were evaluated by the following methods.

1) Glossiness (%)

The glossiness was measured according to JIS (Japanese Industrial Standards) Z8741 Method 4. Method 4 is a method for measuring the specular glossiness of a macroscopically surface of products in the mining and manufacturing industries.

2) Sensitivity in printing

In order to evaluate the sensitivity in printing, a gradation test pattern was printed on the thermal image-receiving sheet under conditions of an applied voltage of 15.7 V and a printing speed of 5.5 msec/line, and the print density in the 9th gradation among 14 gradations was measured with a Macbeth densitometer. The print density was evaluated based on the optical density 1.00. The evaluation criteria are as follows.

o: Not less than 1.10
Δ: 0.95 to 1.09
X: Not more than 0.94

3) Appearance

Each thermal transfer image-receiving sheet sample was slitted by means of a slitter, subjected to sheet cutting, and wrapped, packaged, and transported as in the conventional products, and then unpacked to evaluate the surface appearance of the image-receiving sheet by visual inspection. Evaluation criteria are as follows.

o: No scratch observed.
X: Scratch observed.

TABLE 1

(Results of evaluation)

| Sample | Glossiness (%) | Appearance | Sensitivity in printing |
|---|---|---|---|
| Example 1 | 86.5 | O | O |
| Example 2 | 72.3 | O | O |
| Example 3 | 73.3 | O | O |
| Example 4 | 87.2 | O | Δ |
| Example 5 | 89.9 | O | O |
| Example 6 | 86.5 | O | O |
| Comparative Example 1 | 42.3 | O | O |
| Comparative Example 2 | 92.1 | X | O |

What is claimed is:

1. A thermal transfer image-receiving sheet comprising a substrate and a colorant-receptive layer formed on at least one surface of the substrate, said substrate comprising a laminate of a plurality of plastic films, said laminate comprising at least (i) a plastic core layer containing microvoids, and (ii) a plastic skin layer containing microvoids and being formed either (i) on one surface of the core layer such that the skin layer is disposed between the colorant-receptive layer and the core layer or (ii) on both surfaces of the core layer such that the skin layer is disposed between the colorant-receptive layer and the core layer and on an opposite surface of the core layer, wherein the volume fraction of the total volume of the microvoids contained in the skin layer based on the volume of the whole skin layer is smaller than the volume fraction of the total volume of the microvoids contained in the core layer based on the volume of the whole core layer, and wherein the volume fraction of the skin layer is in the range of 1.0 to 15.0%.

2. The thermal transfer image-receiving sheet according to claim 1, wherein the volume fraction of the skin layer is in the range of 2.0 to 12.0%.

3. The thermal transfer image-receiving sheet according to claim 1, wherein the thickness of the skin layer is in the range of 1.5 to 10 μm.

4. The thermal transfer image-receiving sheet according to claim 3, wherein the thickness of the skin layer is in the range of 2.0 to 8 μm.

5. The thermal transfer image-receiving sheet according to claim 1, wherein the substrate further comprises a support on the surface of the laminate remote from the colorant-receptive layer.

6. The thermal transfer image-receiving sheet according to claim 5, wherein the laminate is provided on both surfaces of the support.

7. The thermal transfer image-receiving sheet according to claim 1, wherein the laminate is a biaxially stretched film composed mainly of polypropylene.

8. The thermal transfer image-receiving sheet according to claim 1, which has a surface glossiness of not less than 70% as measured according to JIS Z 8741 Method 4.

* * * * *